United States Patent [19]

Augustin et al.

[11] Patent Number: 5,045,212

[45] Date of Patent: Sep. 3, 1991

[54] PROCESS FOR THE SEPARATION OF OIL-IN-WATER EMULSIONS

[75] Inventors: Thomas Augustin, Cologne; Rolf Kehlenbach, Bergisch-Gladbach; Ulrich Litzinger, Hachenburg, all of Fed. Rep. of Germany

[73] Assignee: Bayer Aktiengesellschaft, Leverkusen, Fed. Rep. of Germany

[21] Appl. No.: 529,007

[22] Filed: May 24, 1990

[30] Foreign Application Priority Data

Mar. 27, 1990 [DE] Fed. Rep. of Germany ....... 4009760

[51] Int. Cl.$^5$ ............................................. B01D 17/05
[52] U.S. Cl. ................................... 210/708; 210/727; 210/734; 210/735
[58] Field of Search ............... 210/708, 727, 728, 734, 210/735

[56] References Cited

U.S. PATENT DOCUMENTS

| | | | |
|---|---|---|---|
| Re. 29,908 | 2/1979 | Fowler et al. | 210/708 |
| 2,318,714 | 5/1943 | Robertson et al. | 210/708 |
| 4,184,949 | 1/1980 | Sader | 210/727 |
| 4,387,028 | 6/1983 | Fee | 210/708 |
| 4,734,205 | 3/1988 | Jacques et al. | 210/708 |
| 4,797,214 | 1/1989 | Sevier | 210/727 |

*Primary Examiner*—Peter Hruskoci
*Assistant Examiner*—Krisanne Shideler
*Attorney, Agent, or Firm*—Sprung Horn Kramer & Woods

[57] ABSTRACT

The process according to the invention for the separation of oil-in-water emulsions by treatment of the emulsions with organic ionic demulsifiers and/or inorganic demulsifiers comprises carrying out the separation in two steps by first adding an organic cationic demulsifier to the o/w emulsions, and then adding an inorganic demulsifier, separating the oil phase from the resulting two-phase system and then treating the aqueous phase first with an inorganic demulsifier and then with an organic anionic demulsifier.

7 Claims, No Drawings

PROCESS FOR THE SEPARATION OF OIL-IN-WATER EMULSIONS

The invention relates to an improved process for the separation of oil-in-water (=o/w) emulsions The separation of o/w emulsions is of great industrial importance, since in practice, for example in crude oil production and in metal working, large amounts of o/w emulsions arise and these cannot simply be discarded, for ecological and economic reasons, but must be separated into an aqueous phase of maximum purity, and an organic phase which can be eliminated by secondary separation, further working up or else by incineration.

Until now, o/w emulsions have been separated using single-step processes in which to the o/w emulsions are added either inorganic demulsifiers or organic cationic demulsifiers (cf., for example, EP-A-186,029) or else first organic cationic demulsifiers are added followed by inorganic demulsifiers (modified Windsor process.

However, these processes do not meet present requirements since separation using inorganic demulsifiers requires relatively large amounts of inorganic demulsifiers, in the region of 0.5 to 1% by weight relative to the weight of emulsion, and very large amounts of oil-containing metal salt-containing waste sludges are generated, the removal of which causes great difficulties. Separation using organic cationic demulsifiers gives aqueous phases whose hydrocarbons content is >50 mg/l, this exceeding by a wide margin the permissible level for water which may be discharged into outfall ditches. Similar criticism applies to the modified Windsor process; this also gives only aqueous phases whose hydrocarbons content is still significantly above the permissible level.

Surprisingly, it has been found that o/w emulsions can be separated efficiently into an organic phase and an aqueous phase whose hydrocarbons content is below the permissible level, with concurrent low formation of inorganic residue which moreover is only contaminated with oil to a minor degree, by carrying out the separation using inorganic and organic demulsifiers in two steps so that to the o/w emulsions is first added an organic cationic demulsifier followed by an inorganic demulsifier, the organic phase is separated off from the resulting two-phase system and the aqueous phase is again treated with the demulsifiers, but this time first an inorganic demulsifier is added followed by an organic anionic demulsifier.

The present invention accordingly provides a process for the separation of oil-in-water emulsions (o/w emulsions) by treatment of the emulsions with organic ionic demulsifiers and/or inorganic demulsifiers (flocculants, salts), characterized in that the separation is carried out in two steps, that to the o/w emulsions is first added an organic cationic demulsifier followed by an inorganic demulsifier, the oil phase is separated off from the resulting two-phase system and the aqueous phase is then treated first with an inorganic demulsifier and then with an organic anionic demulsifier.

The inorganic and organic ionic demulsifiers used in the process according to the invention are the known inorganic and organic ionic emulsifiers. These are often referred to in the literature also as flocculants. Demulsifiers (flocculants) of this type are described, for example, in Kirk-Othmer, "Encyclopedia of Technical Chemistry", 3rd Edition, Vol. 10, page 489 et seq.

In the process according to the invention, the inorganic demulsifiers used are preferably salts of multivalent metals and in particular in the first separation step are preferably salts of trivalent metals, for example $AlCl_3$, $Al_2(SO_4)_3$, $Fe_2(SO_4)_3$, and in the second separation step are preferably salts of divalent metals, for example $CaCl_2$ and $CaO$.

In the first separation step, the salts are used in amounts of 50–1000 ppm, preferably 100–500 ppm relative to the weight of the o/w emulsion to be separated and in the second separation step, the salts are used in amounts of 200–2000, preferably 200 to 1000 ppm relative to the weight of the aqueous phase.

The organic anionic demulsifiers used are preferably the known anionic polymers based on acrylamide/(meth)acrylic acid or acrylic ester/(meth)acrylic acid copolymers. Particular preference is given to the copolymers having a high molecular weight ($\overline{MG}$ >0.8 million) and average ionic character (i.e. the (meth)acrylic acid content of the copolymers being about 30 to 50% by weight).

The organic cationic demulsifiers used are preferably synthetic polymers based on polyamines, polyimines, polyether-polyamines, polyamines and polyamideamines or quaternized polyamines and quaternized polyamideamines, and also cationic copolymers made from acrylamide and different proportions of cationic monomers or oligomers, and homopolymers of dimethyldiallylammonium chloride (cf., for example, Kirk Othmer, Encyclopedia of Chemical Technology, 3rd Ed., Vol. 10, p. 489 et seq.). Organic cationic demulsifiers based on polyamines, polyimines, polyether-polyamines and polyamideamines have proved particularly suitable.

The organic cationic demulsifiers are preferably used in amounts of 30–5000 ppm, particularly preferably 100–500 ppm relative to the weight of the o/w emulsion to be separated. The organic anionic demulsifiers are preferably used in amounts of from 0.3 to 4 ppm, particularly preferably in amounts of from 0.5 to 2 ppm relative to the weight of the aqueous phase.

The process according to the invention can be carried out as follows:

1st step

The demulsifiers are successively admixed with stirring to the o/w emulsion which is to be separated, the order of addition being first the organic cationic demulsifier and then the inorganic demulsifier. After a certain time, the creaming time, the creaming organic phase, which contains oil and flocs, is separated off. This can be worked up, for example by secondary separation (w/o demulsification), or incinerated as such.

2nd step

The demulsifiers are then successively admixed with stirring to the aqueous phase, the order of addition being first the inorganic demulsifier and then the organic anionic demulsifier. After the residue has been deposited, the clear aqueous phase is separated from the solid residue. This aqueous phase can often be introduced, without further treatment, into the outfall ditch.

The process according to the invention is suitable for the separation of o/w emulsions from a great many sources and of widely different compositions, for example cooling lubricant emulsions and rolling oil emulsions, crude oil/water emulsions, emulsions of the type occurring, for example, in the form of washing liquors, degreasing baths, paint shop wastewaters, oil-containing condensates, tank-cleaning wastewaters, bilge waters and slop oils and also those occurring in the processing of animal and vegetable products and in the wastewaters from breweries, distilleries and paperproducing and paper-processing operations.

EXAMPLE 1

To an o/w emulsion used as a cooling lubricant is added with stirring first 0.02% by weight of the cationic flocculant K1 described below followed by 0.02% by weight of a 30% by weight AlCl' solution. After a creaming time of one hour, the organic phase is separated off. To the aqueous phase is then added in succession with stirring first 0.06% by weight of calcium oxide and then 1.0 ppm of the anionic flocculants A1 [Praestol 2540; commercial product supplied by Stockhausen; high molecular weight acrylamide/(meth)acrylic acid copolymer ((meth)acrylic acid content: about 40% by weight, relative to the weight of the copolymer)].

The clear aqueous phase which is obtained after the stirrer has stopped and the solids have been deposited has a residual oil content of only 18 ppm. The amount of residual sludge is only 0.1% by weight relative to the weight of the aqueous phase.

The table which follows gives the results (residual content of hydrocarbons in the aqueous phases [mg/1], and by the method (1- or 2-step) likewise given in the table.

If the organic and inorganic demulsifiers used in Examples 1 and 2 were added to the o/w emulsion in the order described but without intermediate separation of the aqueous phase, i.e. in a one-step operation, no separation of the emulsion was achieved.

The organic cationic demulsifiers K1, K2, K3, K4 and K5 used in Examples B, C and 1–6 were the following products:

K 1: polyamideamine obtained by reacting the condensation product of adipic acid and diethylenetriamine with a mixture of low molecular weight polyethylenepolyamines and 1,2-dichloroethane in accordance with EP-B2-0,002,474 (polyamine 2).

K 2: polyamideamine, obtained by reacting the condensation product of adipic acid and diethylenetriamine with 1,2-dichloroethane in accordance with EP-B1-0,003,499, Example IIIa.

K 3: polyamine, obtained by reaction of the diethylenetriamine with 1,2-dichloroethane similarly to Example 6 of GB-B-775,721.

K 4: polyamine, the reaction product of bisaminopropylmethylamine and 1,2-dichloroethane, obtainable in accordance with Example 6 of GB-B-775,721.

K 5: polyether-polyamideamine, the reaction product in accordance with EP-A-0,000,714, Example 5c, of a polyetheramine and a basic polyamide.

TABLE

| | 1st separation | | | | 2nd separation | | | | Residual | | Amount | Amount |
|---|---|---|---|---|---|---|---|---|---|---|---|---|
| Example | org. cation. demulsifiers | Amount % by wt. | inorg. demulsifier | Amount % by wt. | inorg. demulsifier | Amount % by wt. | org. anion. demulsifier | Amount ppm | HC content (mg/l) | Water quality | of residue % by wt. | of residue [%]* |
| A (inorganic demulsification) | −/− | −/− | FeSO₄ × H₂O/ CaO | 0.64 | −/− | −/− | −/− | −/− | 32 | clear | 1.4 | −/− |
| B (organic demulsification) | K1 | 0.15 | −/− | −/− | −/− | −/− | −/− | −/− | 410 | turbid | −/− | −/− |
| C (modified Windsor process) | K1 | 0.05 | AlCl₃ | 0.02 | −/− | −/− | −/− | −/− | 78 | almost clear | −/− | −/− |
| 1 | K1 | 0.02 | AlCl₃ | 0.02 | CaO | 0.06 | A1 | 1.0 | 18 | Clear | 0.1 | 7 |
| 2 | K2 | 0.05 | AlCl₃ | 0.03 | CaCl₂/ NaOH | 0.01 0.01 | A1 | 1.0 | 19 | Clear | 0.11 | 8 |
| 3 | K3 | 0.05 | AlCl₃ | 0.02 | NaOH/ MgCl₂ | 0.05 0.1 | A1 | 1.0 | 19 | Clear | 0.28 | 20 |
| 4 | K4 | 0.05 | AlCl₃ | 0.02 | NaOH/ FeSO₄ | 0.04 0.1 | A1 | 1.0 | 20 | Clear | 0.2 | 15 |
| 5 | K5 | 0.05 | AlCl₃ | 0.02 | NaOH/ AlCl₃ | 0.15 0.1 | A1 | 1.0 | 19 | Clear | 0.1 | 7 |
| 6 | K1 | 0.05 | AlCl₃ | 0.02 | NaOH/ Ce(SO₄)₂ | 0.045 | A1 | 1.0 | 19 | Clear | 0.15 | 11 |

*relative to the amount of residue occurring in A (visually determined) water quality, amount of residue (sludge) produced [% by weight] relative to the weight of the o/w emulsion; the decrease achieved in the amount of sludge [%] relative to the amount of sludge occurring in inorganic demulsification (Comparative Example A)), these results being achieved by treating the o/w emulsion used as a cooling lubricant, in a known manner (Comparative Examples A, B, C), and in a manner according to the invention (Examples 1–6), with the inorganic and/or organic demulsifiers (flocculants) given in the table in the amounts given in the table

What is claimed is:

1. A process for the separation of an oil-in-water emulsion in which the separation is carried out in two steps, whereby in the first step to the oil-in-water emulsion there is added first from about 30 to about 5,000 ppm organic cationic demulsifier followed by from about 50 to about 1,000 ppm inorganic demulsifier, to form a two-phase system comprising an oil phase and an aqueous phase, the oil phase is separated off from the resulting two-phase system and in the second step the remaining aqueous phase is treated first with from about 200 to 2,000 ppm inorganic demulsifier and then with from about 0.3 to 4 ppm organic anionic demulsifier.

2. The process of claim 1, in which the organic cationic demulsifiers used are synthetic polymers based on polyamines, polyimines, polyether-polyamines and/or polyamideamines.

3. The process of claim 1, in which the inorganic demulsifier used in the first separation step is a salt of a trivalent metal.

4. The process of claim 3, in which aluminium salts and/or iron (III) salts are used.

5. The process of claim 1, in which the inorganic demulsifier used in the second separation step is a salt of a divalent metal.

6. The process of claim 5, in which calcium salts and/or magnesium salts are used.

7. The process of claim 1, in which the organic anionic demulsifiers used are acrylamide/(meth)acrylic acid copolymers having a molecular weight of about 0.8 million or higher and a (meth)acrylic acid content of from about 30 to 50% by weight of the copolymer.

* * * * *